No. 697,179. Patented Apr. 8, 1902.
F. L. SLAZENGER.
GOLF STICK.
(Application filed Oct. 9, 1901.)
(No Model.)
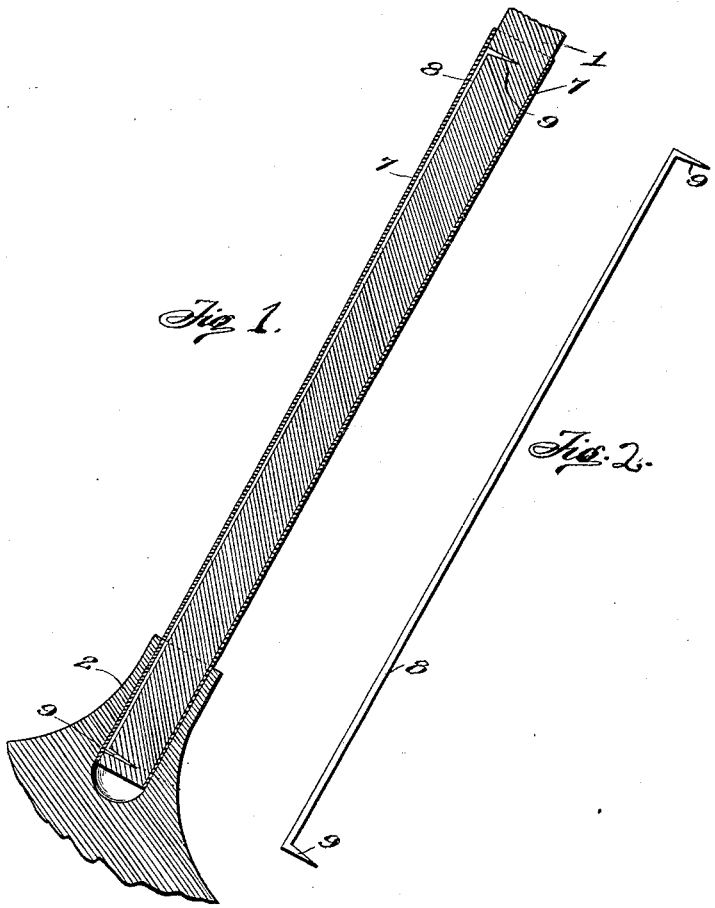

UNITED STATES PATENT OFFICE.

FRANK LEGH SLAZENGER, OF NEW YORK, N. Y.

GOLF-STICK.

SPECIFICATION forming part of Letters Patent No. 697,179, dated April 8, 1902.

Application filed October 9, 1901. Serial No. 78,107. (No model.)

*To all whom it may concern:*

Be it known that I, FRANK LEGH SLAZENGER, a citizen of the United States, residing at New York, in the county of New York and State of New York, have invented certain new and useful Improvements in Golf-Sticks; and I do hereby declare the following to be a full, clear, and exact description of the invention, such as will enable others skilled in the art to which it appertains to make and use the same.

My invention has relation to a reinforcement of handles for golf-sticks, polo-mallets, &c.; and my object is to provide simple though reliably-efficient means whereby the handle may be greatly strengthened or reinforced at its weakest point, thereby insuring that the efficiency and durability of the handle will be greatly augmented without in any wise impairing the requisite flexibility of said part.

Other objects and advantages will be made clearly apparent from the following specification, considered in connection with the accompanying drawings, in which—

Figure 1 is a longitudinal central section showing a portion of a golf-handle inserted in the part designed to coöperate therewith. Fig. 2 is a detail view showing one means of reinforcing the handle-section at its weakest point.

Numerals will be employed to refer to the various details of my invention and coöperating accessories, and, referring to the numerals upon the drawings, 1 indicates the handle of a golf-stick, while 2 designates the member designed to be secured to the handle in such a manner that said parts will be held in reliably coöperative relationship.

In Fig. 1 I have illustrated a form of construction which may be adopted for reinforcing the weaker portion of the handle 1, inasmuch as I entirely inclose or cover the lower end of said handle or that portion thereof contiguous to the member 2 with a suitable reinforcing-thimble 7, which may be formed of metal or may be replaced by a wrapping of wax-thread or the equivalent thereof. If the thimble 7 or its equivalent is employed, I prefer to reinforce that side of the handle adjacent to the ball-striking surface of the member 2 with the shaft or plate 8, provided at each end with the anchoring-terminals 9, adapted to take into a contiguous aperture provided in the handle, the said reinforcing plate or shaft 8 being properly secured in position so as to be left flush with the surface of the handle, when the exterior reinforcing-thimble 7 may be slipped over the end of the handle and the entire end of the handle thus inserted in the member 2, as indicated in Fig. 2.

Having thus fully described my invention, what I claim as new, and desire to secure by Letters Patent, is—

A golf-stick and the like comprising a handle portion, the coöperating member, and a reinforcing-shaft lying parallel with said handle portion with anchoring-terminals embedded in said handle portion and a thimble surrounding and snugly sleeved upon said handle portion and bearing against said reinforcing-shaft all substantially as and for the purpose specified.

In testimony whereof I affix my signature in presence of two witnesses.

FRANK LEGH SLAZENGER.

Witnesses:
 MOLLIE A. MEYERS,
 ELLA K. DIRICKSON.